(12) United States Patent
Nguyen et al.

(10) Patent No.: US 11,603,891 B2
(45) Date of Patent: Mar. 14, 2023

(54) BIDIRECTIONAL MAGNETO-RHEOLOGICAL ACTUATOR

(71) Applicant: Quoc Hung Nguyen, Thu Dau Mot (VN)

(72) Inventors: Quoc Hung Nguyen, Thu Dau Mot (VN); Xuan Hung Nguyen, Ho Chi Minh (VN)

(73) Assignee: HO CHI MINH CITY UNIVERSITY OF TECHNOLOGY (HUTECH), Ho Chi Ming (VN)

( * ) Notice: Subject to any disclaimer, the term of this patent is extended or adjusted under 35 U.S.C. 154(b) by 217 days.

(21) Appl. No.: 17/097,861

(22) Filed: Nov. 13, 2020

(65) Prior Publication Data

US 2022/0154786 A1 May 19, 2022

(51) Int. Cl.
*F16D 37/02* (2006.01)
*F16D 57/00* (2006.01)
*F16D 121/18* (2012.01)
*F16D 37/00* (2006.01)

(52) U.S. Cl.
CPC ........... *F16D 37/02* (2013.01); *F16D 57/002* (2013.01); *F16D 2037/005* (2013.01); *F16D 2121/18* (2013.01)

(58) Field of Classification Search
CPC .... F16D 37/02; F16D 57/002; F16D 2121/18; F16D 2037/005
See application file for complete search history.

(56) References Cited

FOREIGN PATENT DOCUMENTS

| CN | 101793312 A | * | 8/2010 | |
|---|---|---|---|---|
| CN | 102052423 A | * | 5/2011 | |
| CN | 103603891 A | * | 2/2014 | |
| CN | 105221602 A | * | 1/2016 | |
| CN | 109027046 A | * | 12/2018 | ........... F16D 37/008 |
| DE | 102015011444 A1 | * | 3/2017 | |
| JP | 2000065094 A | * | 3/2000 | ............. F16D 37/02 |

* cited by examiner

*Primary Examiner* — Melody M Burch
(74) *Attorney, Agent, or Firm* — Sinorica LLC

(57) ABSTRACT

Disclosed herein is a bidirectional MR actuator comprising a first input member comprising a first rotor, an output member comprising a second rotor and a second input member comprising a housing having a non-magnetic portion and a magnetic portion. Each of the first input member and the output member are coupled to the second input member, the housing defining a chamber for accommodating the first rotor and the second rotor therein and further for receiving a quantity of MR fluid therewithin. The actuator further comprises a magnetic field generation assembly comprising a first coil assembly configured to selectively apply a magnetic field to a portion of the MR fluid between the first rotor and the second rotor, and a second coil assembly configured to selectively apply a magnetic field to a portion of the MR fluid between the second rotor and the magnetic portion of the housing.

13 Claims, 5 Drawing Sheets

BIDIRECTIONAL MAGNETO-RHEOLOGICAL ACTUATOR

TECHNICAL FIELD

The present invention relates generally to a bidirectional magneto-rheological actuator.

BACKGROUND

Actuators are typically used as components for moving or steering system parts for controlling system processes. In many applications, may be used to provide haptic feedback to a user. Actuators utilized for generating haptic feedback may comprise resistive actuators. Resistive actuators can be mechanical or magnetic in nature. Haptic feedback generated by actuators can increase the amount of information available to the user by providing an additional medium through which to transfer system information. When used as a component of an apparatus or system, the haptic resistance provided by the magnetic actuator can be correlated with specific apparatus or system information in response to user input Haptic feedback system, or simply referred to as Haptics, makes it possible to feel like you are feeling or interacting with objects and the surrounding even when the user is a distance away in another location, or when the object or environment interacted with exist only virtually. Magneto-rheological (MR) fluids has been quickly researched and applied in this area, particularly in MR gloves. The essence of MR gloves is a combination of many MR brakes, which block the movement of the fingers in proportion to the actual feedback force. From there the gloved person can feel like being directly manipulated. Today, Haptics is being used quite widely, especially in the field of medicine, which helps a doctor to perform important operations remotely.

It is known that the inherent disadvantage of MR brake is its off-state force, specifically, the presence of uncontrollable torque. Due to the off-state force of the MR brakes, a small feedback force in MR haptic system cannot be archived which reduces performance of the haptic system. In addition, for MR brake based haptic system, in order to translate the feedback force the user or operator, require the user to first introduce movement to the haptic system. Thus, the feedback force is not reflected to the operator if the haptic system is stationary. In order to remedy the disadvantages of the MR brake based haptic system, bidirectional magneto-rheological actuators (BMRA) has been developed for haptic applications. An available prior art sees the development of a BMRA featuring MR fluid (MRF) and driven by a DC servo motor for application in a 2D haptic joystick, which was later implemented in haptic systems for robotic surgery. This device consists of two bi-directional magneto-rheological (BMR) brakes incorporated with a gimbal mechanism. The benefits of the BMR brakes compared to conventional ones are the possibility of compensating to undesired friction and consistency of torque reflexes in different environments from soft (free) to hard (collision) stiffness ones. Additionally, this configuration can generate both pull and resistant torque.

There have been several studies related to MRB configurations aimed at optimizing braking performance for generating the pull and resistant torque. In one disclosed BMRA configuration, two discs rotate in opposite directions with the same angular velocity within a housing. The gap between discs and housing is filled with MRF. Two sets of magnetic coils are wound in an outer cylinder of the housing proximal the circumference of the respective two discs. The coils are exciting independent of each other depending on the desired direction of BMRA. A non-magnetic partition is inserted in the housing between the two sets of magnetic coils to prevent magnetic flux intended for one disc from passing over to the other disc. As the power of coil is turned on, magnetic field is generated and the MRF in duct becomes solid-like instantaneously. The shear friction between solidified MRF and rotor provides the required braking torque. The disadvantage in this configuration is the bottle-neck of magnetic flux which limits the dimensions of the coil, which in turn, limits the level of torque.

In another disclosed BMRA configuration, the coils of BMRA along opposing side walls of the housing and away from the circumference of the two discs with the two discs interfacing the two sets of magnetic coils. With this configuration, the bottle-neck in the magnetic flux of conventional configuration is eliminated. Moreover, ease of manufacturing and maintenance is greatly increased. Further, the mass of BMRA is reduced significantly in comparison with the previous configuration. However, the thin side walls of the housing results in magnetic saturation occurring in the side walls even when the discs are far from magnetic saturation. This may result in the size of discs influencing the volume and mass increase of the BMRA.

In another disclosed BMRA configuration, the coils on each side wall of the housing the segregated into multiple smaller coils. This results in higher power consumption but with significantly reduced mass and size of the overall BMRA. Hence, there is a need for a BMRA to address the foregoing issues.

SUMMARY

In accordance with a first aspect of the invention, there is disclosed a bidirectional magneto-rheological (MR) actuator for generating a torque or force output and for providing resistance to a torque or force input, comprising a first input member comprising a first rotor, an output member comprising a second rotor having a first face and a second face outwardly opposing the first face and a second input member comprising a housing having a non-magnetic portion and a magnetic portion. Each of the first input member and the output member being rotatably coupled to the second input member, the housing defining a chamber being shaped and dimensioned for accommodating the first rotor and the second rotor therein and further for receiving a quantity of MR fluid therewithin. The actuator further comprises a magnetic field generation assembly comprising a first coil assembly configured to selectively apply a magnetic field to a portion of the MR fluid between the first rotor and the second rotor for controlling engagement of the first rotor with the second rotor, and a second coil assembly configured to selectively apply a magnetic field to a portion of the MR fluid between the second rotor and the magnetic portion of the housing for controlling engagement of the second rotor with the magnetic portion of the housing. The first coil assembly and the second coil assembly are coupled to the second rotor.

In accordance with a second aspect of the invention, there is disclosed a bidirectional magneto-rheological (MR) actuator for generating a torque or force output and for providing resistance to a torque or force input, comprising a first input member comprising a first rotor, an output member comprising a second rotor having a first face and a second face outwardly opposing the first face, and a second input member comprising a housing having a non-magnetic portion and a magnetic portion, each of the first input member and the output member being rotatably coupled to the second input member. The housing defines a chamber being shaped and dimensioned for accommodating the first rotor and the second rotor therein and further for receiving a quantity of MR fluid therewithin. The actuator further comprises a magnetic field generation assembly adapted to selectively apply a magnetic field to a portion of the MR fluid between the first rotor and the second rotor for controlling engagement of the first rotor with the second rotor, and further adapted to selectively apply a magnetic field to a portion of the MR fluid between the second rotor and the magnetic portion of the housing for controlling engagement of the second rotor with the magnetic portion of the housing.

BRIEF DESCRIPTION OF THE DRAWINGS

For a better understanding of the present disclosure, non-limiting and non-exhaustive embodiments are described in reference to the following drawings. In the drawings, like reference numerals refer to parts through all the various figures unless otherwise specified.

DETAILED DESCRIPTION

Figure 1:
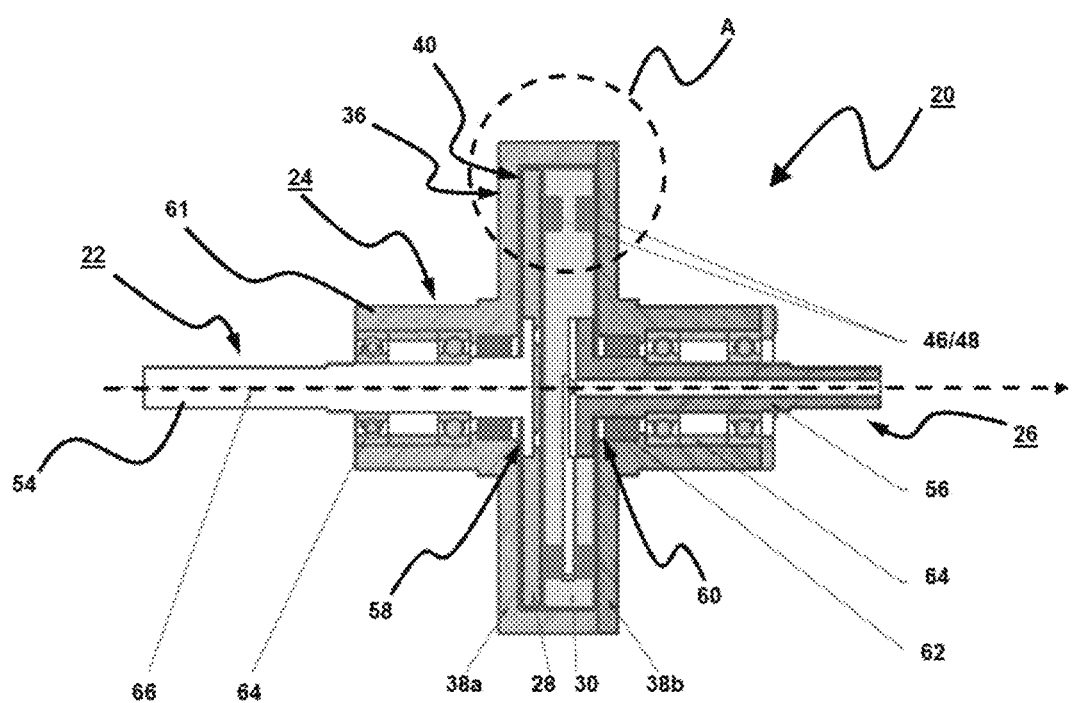
FIG. 1 shows a partial side sectional view of a bidirectional magneto-rheological (MR) actuator according to an aspect of the invention.
Figure 2:
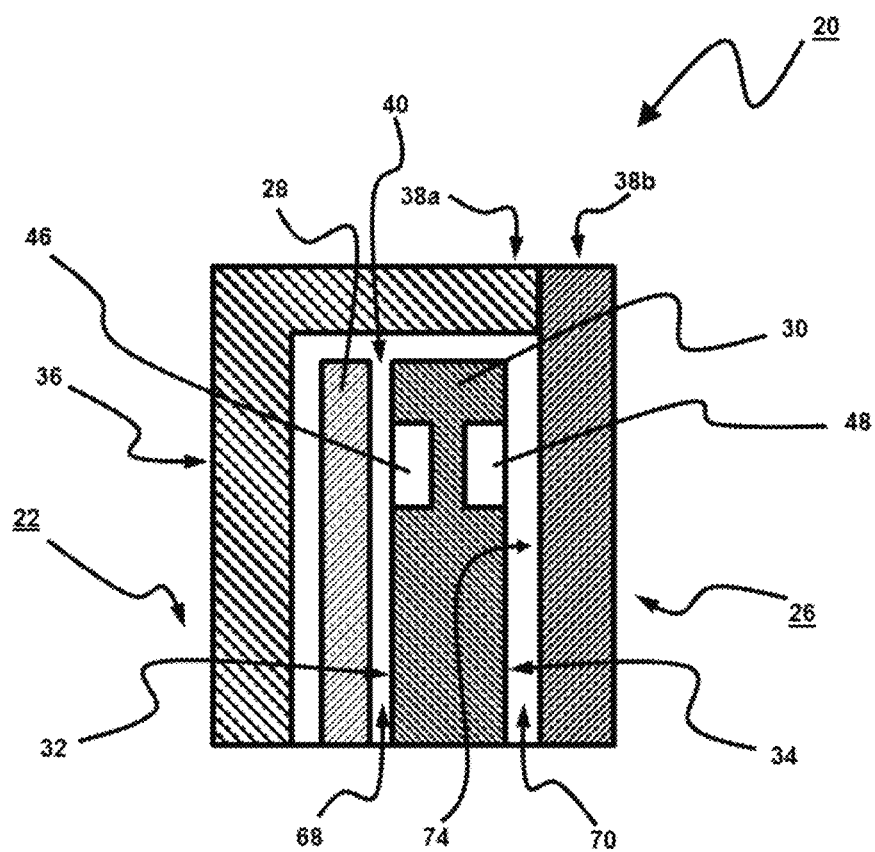
FIG. 2 shows a partial side sectional view of view "A" of the bidirectional MR actuator of FIG. 1.

An exemplary embodiment of the present invention, a bidirectional magneto-rheological (MR) actuator 20, is described hereinafter with reference to FIG. 1 to FIG. 5.

The bidirectional MR (BMR) actuator 20 is generally for generating a torque or force output and for providing resistance to a torque or force input. The BMR actuator 20 comprises a first input member 22, a second input member 24 and an output member 26. The first input member 22 comprises a first rotor 28. The output member 26 comprises a second rotor 30 having a first face 32 and a second face 34 outwardly opposing the first face 32. The second input member 24 comprises a housing 36 having a non-magnetic portion 38a and a magnetic portion 38b. In an implementation of the BMR actuator 20, the second rotor 30 substantially interposes the first rotor 28 and the magnetic portion 38b of the housing 36. In this implementation, the first face 32 of the second rotor 30 inwardly opposes one of two outwardly opposing faces of the first rotor 28 while the second face 34 faces the magnetic portion 38b of the housing 36.

Each of the first input member 22 and the output member 26 are rotatably coupled to the second input member 24. The housing 36 defines a chamber 40 being shaped and dimensioned for accommodating the first rotor 28 and the second rotor 30 therein and further for receiving a quantity of MR fluid therewithin. The BMR actuator 20 further comprises a magnetic field generation assembly 44 comprising a first coil assembly 46 configured to selectively apply a magnetic field to a portion of the MR fluid between the first rotor 28 and the second rotor 30 for controlling engagement of the first rotor 28 with the second rotor 30, and a second coil assembly 48 configured to selectively apply a magnetic field to a portion of the MR fluid between the second rotor 30 and the magnetic portion 38b of the housing 36 for controlling engagement of the second rotor 30 with the magnetic portion 38b of the housing 36. Preferably, the first coil assembly 46 and the second coil assembly 48 are coupled to the second rotor 30.

Preferably, the first coil assembly 46 comprises at least one magnetic coil being formed on the first face 32 of the second rotor 30 and the second coil assembly 48 comprises at least one magnetic coil being formed on the second face 34 of the second rotor 30. The first face 32 of the second rotor 30 substantially faces the non-magnetic portion 38a of the housing 36 and the second face 34 of the second rotor 30 substantially faces the magnetic portion 38b of the housing 36. Further, the second rotor 30 defines at least one first recess in the first face 32 thereof for receiving the at least one magnetic coil of the first coil assembly 46 and the second rotor 30 further defining at least one second recess in the second face 34 thereof for receiving the at least one magnetic coil of the second coil assembly 48. Preferably, winding of the at least one magnetic coil of each of the first coil assembly 46 and the second coil assembly 48 is to be performed using appropriate tension to the wire to avoid damage to the at least one magnetic coil of each of the first coil assembly 46 and the second coil assembly 48.

The first input member 22 further comprises an input shaft 54 extending from the first rotor 28 and the output member 26 further comprises an output shaft 56 extending from the second rotor 30. The non-magnetic portion 38a of the housing 36 defines a first aperture 58 wherethrough the input shaft 54 extends for rotatable coupling with the housing 36. The magnetic portion 38b of the housing 36 defines a second aperture 60 wherethrough the output shaft 56 extends for rotatable coupling with the housing 36. The second input member 24 further comprises an input sleeve 61 extending from the non-magnetic portion 38a of the housing 36 and coupled adjacent the first aperture 58 with the input sleeve 61 being cylindrically shaped and is configured concentric the input shaft 54.

Preferably, the housing 36 comprises a pair of seals 62, for example lip seals, disposed adjacent the first aperture 58 and the second aperture 60 for fluid sealing the input shaft 54 and the output shaft 56 with the housing 36 to prevent leakage of the quantity of MR fluid. The housing 36 further comprises a pair of mechanical bearings 64 disposed adjacent the first aperture 58 and the second aperture 60 for reducing rotational friction between the housing 36 and each of the input shaft 54 and the output shaft 56. Further, silicon gasket is used around assembly surfaces of the BMR actuator 20 to prevent MR fluid leakage. The preferred manufacturing tolerance for components of the BMR actuator is ±0.001 mm.

The output member 26 defines a rotational axis 66 about which each of the first input member 22 and the second input member 24 is rotatable relative the output member 26. Each of the first face 32 and the second face 34 of the second rotor 30 being substantially perpendicular the rotational axis 46.

Preferably, the quantity of MR fluid is a controllable medium having a rheology variable response to changes in magnetic field generated by the magnetic field generation assembly 44 for controllably and selectively resisting rotation of the first rotor 28 and the housing 36 about the rotational axis 66. Preferably, the magnetic portion 38b of the housing 36 is made from C45 steel.

The first rotor 28 and the second rotor 30 are positioned within the chamber 40 for defining a first fluid slot 68 between the first rotor 28 and the second rotor 30, and a second fluid slot 70 between the second rotor 30 and the magnetic portion 38b of the housing 36. The first coil assembly 46 is excitable to apply magnetic field to the MR fluid in the first fluid slot 68 to provide resistance to an input torque applied to the first input member 46 about the rotational axis 66 in a first rotational direction and the second coil assembly 48 is excitable to apply magnetic field to the MR fluid in the second fluid slot 70 to provide resistance to an input torque applied to the second input member 48 about the rotational axis 66 in a second rotational direction.

The first input member 22 and the second input member 24 are couplable to at least one external actuator for rotatably displacing the first input member 22 in the first rotational direction and the second input member 24 in the second rotational direction. Preferably, the angular velocity of the first input member 22 is substantially the angular velocity of the second input member 24 when rotatably displaced by the at least one external actuator. The at least one external actuator can comprise a pair of electric motors, each being coupled to a respective one of the first input member 22 and the second input member 24 for rotationally displacing in opposing directions. Alternatively, the at least one external actuator comprises a single electric motor being coupled via a transmission system, for example via a series of gears, belts or pulleys, for displacing the first input member 22 and the second input member 24 in opposing directions.

As the MBR actuator 20 has a structure that is asymmetric, the distributed magnetic flux on both sides of the plane of the second rotor 30 between when the first coil assembly 46 and the second coil assembly 48 are excited are also different. To simplify the complexity in calculation for design, specification and analysis, the non-magnetic portion 38a of the housing 36 is introduced. This is to enable the magnetic region of the BMR actuator 20, specifically comprising at least the first rotor 28, the second rotor 30 and the magnetic portion 38b of the housing 36 to remain substantially structurally symmetric on both sides of the plane of the second rotor 30.

Hence, calculating output torque of BMR actuator 20 can be performed by assuming that only one of the first coil assembly 46 and the second coil assembly 48 is excited at any one time. Therefore, when the first coil assembly 46 is excited, the output member 26 will rotate in the same direction as the first input member, and when the second coil assembly 48 is excited, the output member 26 rotates in the same direction as the magnetic portion 38b of the housing 36.

Each of the first rotor 28 and the second rotor 30 being shaped substantially as a circular disc and the magnetic portion 38b of the housing 36 being formed as a plate. Further, the non-magnetic portion 38a of the housing 36 is shaped as a case defining the chamber 40 and an opening 74 thereto, the magnetic portion 38b of the housing 36 is adapted for coupling with the non-magnetic portion 38a of the housing 36 and over the opening 74 thereof for substantially enclosing the chamber 40.

Preferably, the quantity of MR fluid 40 has properties that are shown in Table 1, which are adapted from parameters of MRF-132DG of Lord Corporation, which is far ahead of other MRF manufacturers.

TABLE 1

MRF-132DG Parameters

| Property | Value/limits |
| --- | --- |
| Base fluid | Hydrocarbons |
| Operating temperature | −40 to 130 (° C.) |
| Density | 3090 (kg/m$^3$) |
| Color | Dark gray |
| Weight percent solid | 81.64 (%) |
| Coefficient of thermal expansion (calculated values) | Unit volume per ° C. |
| 0-50 (° C.) | 5.5e−4 |
| 50-100 (° C.) | 6.6e−4 |
| 100-150 (° C.) | 6.7e−4 |
| Specific heat at 25 (° C.) | 800 (J/kg K) |
| Thermal conductivity at 25 (° C.) | 0.25-1.06 (W/m K) |
| Flash point | −150 (° C.) |
| Viscosity (slope between 800 and 0 Hz at 40 (° C.) | 0.09 (±0.02) Pa s |
| k | 0.269 (Pa m/A) |
| β | 1 |

Figure 3:
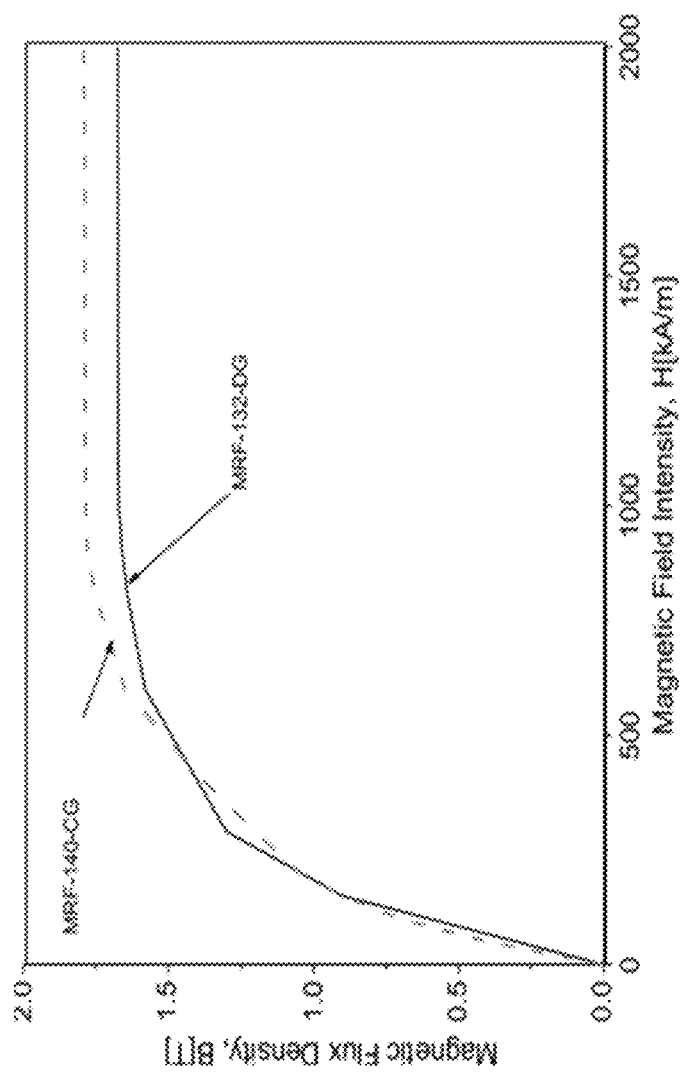
FIG. 3 shows a B-H characteristic curve of a quantity of MR fluid, specifically MRF 132-DG, utilized in the bidirectional MR actuator of FIG. 1.
Figure 4:
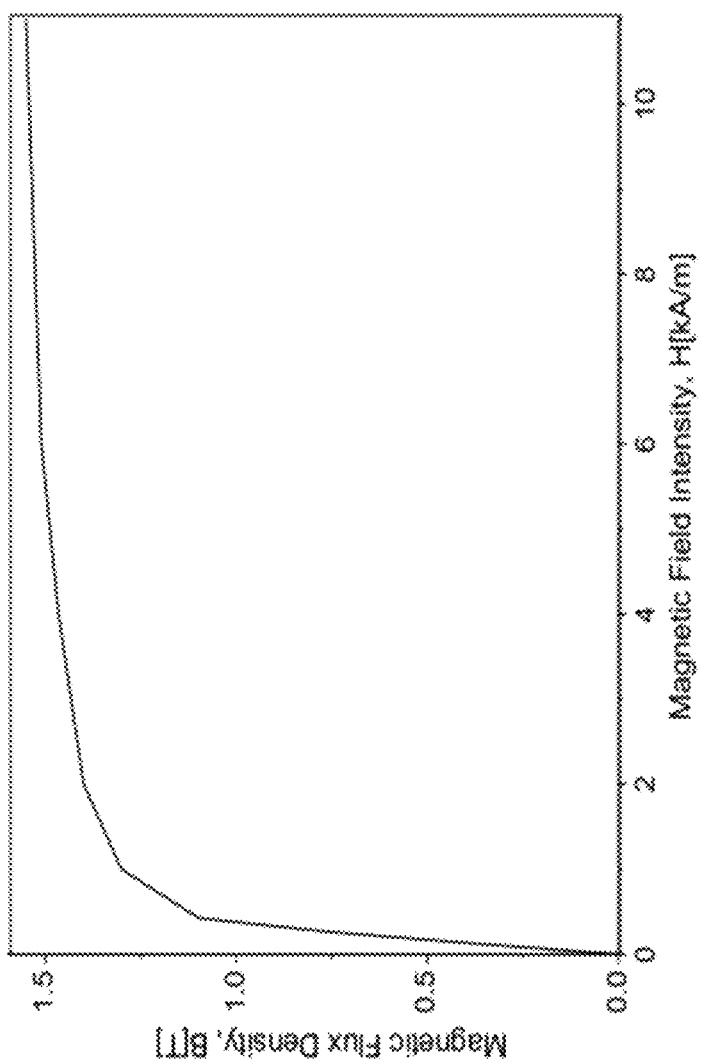
FIG. 4 shows a B-H characteristic curve of a magnetic material, specifically C45 steel, used for forming a first rotor, a second rotor and a magnetic portion of a housing the bidirectional MR actuator of FIG. 1.

The magnetic characteristic of MRF-132DG, wherefrom the parameters in Table 1 are adapted, is nonlinear and is defined by the B-H curve as shown in FIG. 3.

Magnetic material is used for forming the first input member 22, specifically the first rotor 28 thereof, the output member 26, specifically the second rotor 30 thereof, and the magnetic portion 38b of the housing 36. The selection of the magnetic material is an important part of the BMR actuator 20 design and manufacture. The magnetic material must meet working conditions and requirements for design, manufacture and common use in the market. Preferably, the magnetic material is carbon steel C45. C45 steel is widely used in engineering in general and machine building in particular because it is easy to process, has good magnetic conductivity, cheap and is readily available. C45 steel is a good quality steel with a carbon percentage of about 0.42-0.50%. In addition, the components of C45 steel (calculated by weight) are: C=0.4-0.5%; Si=0.17-0.37%; Mn=0.50-0.80%; Ni=0.3%; S=0.045%; P=0.045%; and Cr=0.3%. The magnetic properties of C45 steel are shown as a B-H curve in FIG. 4.

Depending on the strength of the magnetic field applied by the first coil assembly 46 and the second coil assembly 48, the extent that the quantity of MR fluid coalesces can be controlled which, in turn, controls the amount of motion resistance between the output member 26 with each of the first input member 22 and the second input member 24.

In an exemplary implementation of the BMR actuator 20, each of the at least one magnetic coil of the first coil assembly 46 and the at least one magnetic coil of the second coil assembly 48 has a coil width ($w_c$) of 3.59 mm, a coil height ($h_c$) of 11.3 mm and preferably contains 126 coil turns. The second rotor 30 preferably has a radius of 100 mm and a width of 4 mm with a mass of 1.39 kg to apply a torque of 5 Nm. Preferably, each of the first fluid slot 68 and the second fluid slot 70 has a width/gap of 0.8 mm.

Preferably, the magnetic field generation assembly 44 further comprises a controller module 76 for controlling excitation of the first coil assembly 46 and the second coil assembly 48. Specifically, the controller module 26 controls and vary levels or magnitude of current delivered each of the first coil assembly 46 and the second coil assembly 48 which, in turn, controls the amount of magnetic field to be applied to the quantity of MR fluid in the first fluid slot 68 and the second fluid slot 70.

Figure 5:
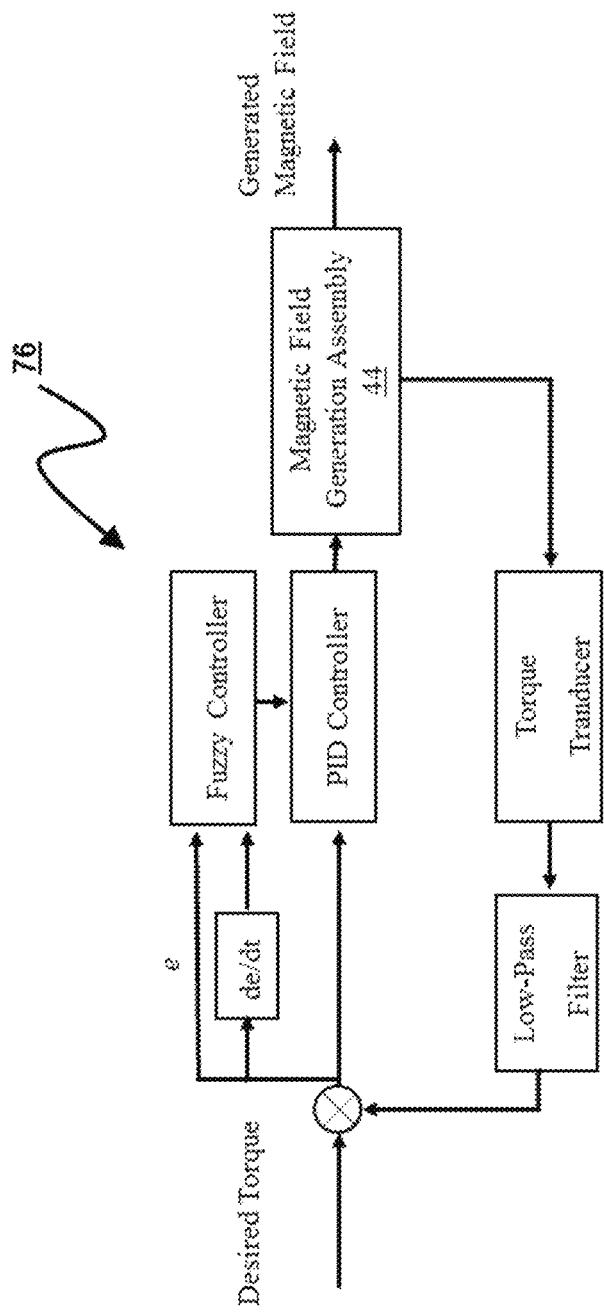
FIG. 5 shows a control diagram of a bidirectional MR actuator control algorithm utilized in a controller module of the bidirectional MR actuator of FIG. 1.

To control the braking torque as desired torque, the controller module 76 implements an exemplary control algorithm as shown in FIG. 5. Fuzzy Gain Scheduling of PID controller is used to control the magnetic field generation assembly 44.

An exemplary discrete-time equivalent expression for PID control, with reference to FIG. 5, is expressed as:

$$u(k) = K_p e(k) + K_i T_s \sum_{i=1}^{n} e(i) + \frac{K_d}{T_s} \Delta e(k) \quad \text{[Equation 1]}$$

where u(k) is the control signal, e(k) is the error between the output signal and the desired signal, $T_s$ is the sampling period, $\Delta e(k)$ is derivative of error with respect to time. PID is trial and error method depending on defining $K_p$, $K_i$ and $K_d$ which plays a vital role in the stability of the system. Moreover, adjusting parameters of this controller brings the different effectiveness of performance which is defined by rising time, overshoot, steady-state and so on. However, the optimum adjustment of these parameters is not trivial. Adjustments to $K_p$, $K_i$ and $K_d$ are performed by Fuzzy logic.

Aspects of particular embodiments of the present disclosure address at least one aspect, problem, limitation, and/or disadvantage associated with existing MR actuators. While features, aspects, and/or advantages associated with certain embodiments have been described in the disclosure, other embodiments may also exhibit such features, aspects, and/or advantages, and not all embodiments need necessarily exhibit such features, aspects, and/or advantages to fall within the scope of the disclosure. It will be appreciated by a person of ordinary skill in the art that several of the above-disclosed structures, components, or alternatives thereof, can be desirably combined into alternative structures, components, and/or applications. In addition, various modifications, alterations, and/or improvements may be made to various embodiments that are disclosed by a person of ordinary skill in the art within the scope of the present disclosure, which is limited only by the following claims.

The invention claimed is:

1. A bidirectional magneto-rheological (MR) actuator for generating a torque or force output and for providing resistance to a torque or force input, comprising:
   a first input member comprising a first rotor;
   an output member comprising a second rotor having a first face and a second face outwardly opposing the first face;
   a second input member comprising a housing having a non-magnetic portion and a magnetic portion, each of the first input member and the output member being rotatably coupled to the second input member, the housing defining a chamber being shaped and dimensioned for accommodating the first rotor and the second rotor therein and further for receiving a quantity of MR fluid therewithin;
   a magnetic field generation assembly comprising a first coil assembly configured to selectively apply a magnetic field to a portion of the MR fluid between the first rotor and the second rotor for controlling engagement of the first rotor with the second rotor, and a second coil assembly configured to selectively apply a magnetic field to a portion of the MR fluid between the second rotor and the magnetic portion of the housing for controlling engagement of the second rotor with the magnetic portion of the housing,
   wherein the first coil assembly and the second coil assembly are coupled to the second rotor; and
   the first coil assembly comprising at least one magnetic coil being formed on the first face of the second rotor and the second coil assembly comprising at least one magnetic coil being formed on the second face of the second rotor, wherein the first face of the second rotor substantially faces the non-magnetic portion of the housing and the second face of the second rotor substantially faces the magnetic portion of the housing.

2. The bidirectional MR actuator as in claim 1, the second rotor defining at least one first recess in the first face thereof for receiving the at least one magnetic coil of the first coil assembly and the second rotor further defining at least one second recess in the second face thereof for receiving the at least one magnetic coil of the second coil assembly.

3. The bidirectional MR actuator as in claim 1, the first input member further comprising an input shaft extending from the first rotor and the output member further comprising an output shaft extending from the second rotor, the non-magnetic portion of the housing defining a first aperture wherethrough the input shaft extends for rotatable coupling with the housing, and the magnetic portion of the housing defining a second aperture wherethrough the output shaft extends for rotatable coupling with the housing,
   wherein the second input member further comprises an input sleeve extending from the non-magnetic portion of the housing and coupled adjacent the first aperture, the input sleeve being cylindrically shaped and is configured concentric the input shaft.

4. The bidirectional MR actuator as in claim 3, the housing comprising a pair of seals disposed adjacent the first aperture and the second aperture for fluid sealing the input shaft and the output shaft with the housing, and a pair of mechanical bearings disposed adjacent the first aperture and the second aperture for reducing rotational friction between the housing and each of the input shaft and the output shaft.

5. The bidirectional MR actuator as in claim 1, the output member defining a rotational axis about which each of the first input member and the second input member is rotatable relative the output member, each of the first face and the second face of the second rotor being substantially perpendicular the rotational axis.

6. The bidirectional MR actuator as in claim 5, the quantity of MR fluid being a controllable medium having a rheology variable response to changes in magnetic field generated by the magnetic field generation assembly for controllably and selectively resisting rotation of the first rotor and the housing about the rotational axis.

7. The bidirectional MR actuator as in claim 1, the magnetic portion of the housing being made from C45 steel.

8. The bidirectional MR actuator as in claim 1, the first rotor and the second rotor being positioned within the chamber for defining a first fluid slot between the first rotor and the second rotor, and a second fluid slot between the second rotor and the magnetic portion of the housing.

9. The bidirectional MR actuator as in claim 8, the first coil assembly is excitable to apply magnetic field to the MR fluid in the first fluid slot to provide resistance to an input torque applied to the first input member about the rotational axis in a first rotational direction and the second coil assembly is excitable to apply magnetic field to the MR fluid in the second fluid slot to provide resistance to an input torque applied to the second input member about the rotational axis in a second rotational direction.

10. The bidirectional MR actuator as in claim 9, the magnetic field generation assembly further comprising a controller module being operable for controlling excitation of the first coil assembly and the second coil assembly.

11. The bidirectional MR actuator as in claim 9, the first input member and the second input member being couplable to at least one external actuator for rotatably displacing the first input member in the first rotational direction and the second input member in the second rotational direction, the angular velocity of the first input member being substantially the angular velocity of the second input member when rotatably displaced by the at least one external actuator.

12. The bidirectional MR actuator as in claim 1, each of the first rotor and the second rotor being shaped substantially as a circular disc and the magnetic portion of the housing being formed as a plate.

13. The bidirectional MR actuator as in claim 12, the non-magnetic portion of the housing being shaped as a case defining the chamber and an opening thereto, the magnetic portion of the housing being adapted for coupling with the non-magnetic portion of the housing and over the opening thereof for substantially enclosing the chamber.

* * * * *